United States Patent [19]

Brown et al.

[11] Patent Number: 5,010,633
[45] Date of Patent: Apr. 30, 1991

[54] CONTROLLED DEFLECTION ROLL WITH HEAT BARRIER

[75] Inventors: Dale A. Brown, Milton; Arnold J. Roerig, Beloit, both of Wis.

[73] Assignee: Beloit Corporation, Beloit, Wis.

[21] Appl. No.: 541,578

[22] Filed: Jun. 21, 1990

[51] Int. Cl.$^5$ ............................................. B21B 29/00
[52] U.S. Cl. ................................. 29/113.2; 29/116.2; 29/129
[58] Field of Search ............... 29/113.1, 113.2, 116.2, 29/129

[56] References Cited

U.S. PATENT DOCUMENTS

| | | |
|---|---|---|
| 3,726,338 | 4/1973 | Sorenson . |
| 3,997,953 | 12/1976 | Christ et al. . |
| 4,007,522 | 2/1977 | Hold et al. . |
| 4,035,038 | 7/1977 | Hinchcliffe et al. . |
| 4,233,011 | 11/1980 | Bolender et al. ............. 29/116.2 X |
| 4,282,639 | 8/1981 | Christ et al. . |
| 4,293,988 | 10/1981 | Biondetti . |
| 4,327,468 | 5/1982 | Küsters et al. . |
| 4,459,726 | 7/1984 | O'Brien et al. .................... 29/129 X |
| 4,679,287 | 7/1987 | Allard . |
| 4,757,584 | 7/1988 | Pav et al. . |
| 4,796,525 | 1/1989 | Schiel et al. . |
| 4,821,384 | 4/1989 | Arav . |
| 4,837,907 | 6/1989 | Roerig et al. . |
| 4,897,905 | 2/1990 | Moschel . |

Primary Examiner—Timothy V. Eley
Assistant Examiner—R. Martin
Attorney, Agent, or Firm—Dirk J. Veneman; Raymond W. Campbell; Gerald A. Mathews

[57] ABSTRACT

A controlld deflection roll has a unique liquid barrier and heat shield which includes a chamber filled with cooling fluid. In a preferred embodiment, the barrier comprises two chambers and a space in fluid communication with both chambers for circulating cooling fluid between the chambers and into and out of the roll. The barrier is interposed between the interior cavity of the roll containing the extremely hot hydraulic fluid which actuates the apparatus for controlling the deflection of the roll, and the bearings which rotatably align the roll shell relative to the space. The barrier, thus, functions to thermally insulate the bearings from heat, whether by radiation or by direct contact with the hydraulic fluid.

21 Claims, 2 Drawing Sheets

CONTROLLED DEFLECTION ROLL WITH HEAT BARRIER

BACKGROUND OF THE INVENTION

1. Field of the Invention

This invention relates to a controlled-deflection type of roll used to process traveling webs, such as paper in a papermaking machine. More particularly, this invention relates to a controlled deflection roll which operates at elevated temperatures to heat the web. Even more particularly, this invention relates to a barrier within such a controlled-deflection roll which separates the extremely hot hydraulic fluid used to actuate the roll shell deflection apparatus, and the heat of the hydraulic fluid, from the bearing lubricant. Still more particularly, this invention relates to a barrier having one or more fluid chambers which contain a cooling liquid which is separate from either the internal hydraulic fluid or the bearing lubricant and which establishes a heat barrier between the internal hydraulic fluid and the bearing lubricant.

2. Description of the Prior Art

As controlled-deflection rolls have developed, and as papermaking has evolved into a more efficient hot-press water removal technology, the operating temperatures of controlled-deflection rolls have increased, particularly in the press section of a papermaking machine to remove moisture, and in the calender section to improve sheet properties. In early designs of controlled deflection rolls, the same oil was often used to both lubricate the bearings and the interface between the shoe, or shoes, which move against and support the roll shell to modify its deflection to maintain the profile of the roll shell along its nip line of contact with a mating roll in a desired contour. The operating temperatures were not excessively high because nip pressures were generally lower, rolls were generally shorter in length, speeds were lower, and the rolls in the press and calender sections in a papermaking machine were not run hot. Often, more than one of these factors was present.

as nip pressures and machine speeds increased, and as papermaking machines became wider, and with the advent of so-called hot pressing wherein the press section of the papermaking machine is desired to run hotter in order to enhance the removal of as much moisture from the traveling paper web as far upstream in the papermaking process as possible, the operating temperature of the hydraulic actuating fluid within controlled-deflection rolls increased to a level beyond that at which the roll shell support bearings, and their lubricant, could operate at the load levels and service life required of them. Similarly, modern calendering techniques also utilize higher roll temperatures. Even if special high temperature bearing lubricant was used, its exposure to either the thinner, less viscous hydraulic fluid used to actuate the deflection correcting apparatus and lubricate its interface with the roll shell, or to the temperature of the hydraulic fluid, or both, was deleterious to the lubrication of the bearings and to their service life. Further, merely sealing the roll shell support bearings from physical contact with the internal hydraulic fluid does not insulate the bearings from the deleterious effects of the increased heat of the hydraulic fluid.

In some prior lubrication arrangements in controlled-deflection types of rolls, the bearings were lubricated with oil which, in turn, was directed into the roll where it either was used to actuate the roll shell support shoe, or mixed with such oil before they were recirculated out of the roll. While such an arrangement operates satisfactorily, it either requires the same lubricant to be used to lubricate the bearings and to actuate the shoe apparatus to control the roll shell deflection, or, if separate lubricants are used, they must necessarily be mixed within the roll and become undesirable for recirculation and subsequent use in either of these functions.

SUMMARY OF THE INVENTION

This invention is best utilized in the type of controlled deflection roll where the roll shell support roller bearings are replaced by hydrostatic bearings within the roll shell, such as shown and described in U.S. Pat. No. 4,821,384 (Arav), or where the roll shell support roller bearings are positioned outside of the roll end seals, such as shown and described in U.S. Pat. No. 4,837,907 (Roerig et al). The disclosure of both of these patents, which are commonly assigned with this invention, are hereby incorporated by reference to the extent which their disclosure complements the disclosure of this invention. This invention establishes a fluid barrier and heat shield between the bearings and the hot hydraulic fluid within the roll used to actuate the roll shell deflection correcting shoes or pistons. In certain types of configurations where drive gears rotate the roll shell, this invention also establishes a fluid barrier and heat shield between the drive gear on the roll and the hot hydraulic fluid. In a preferred embodiment, a hollow, two- chamber barrier is provided about the stationary roll shaft and the outer, rotating components of the roll. The barrier, which does not rotate, comprises inner and outer spool members which are mounted between the stationary shaft and a stationary seal sleeve, respectively, radially inwardly of the roll shell, or an extension thereof.

A cooling liquid is introduced into one of the circumferentially extending chambers and circulated in an outer, hollow cylindrical (annular) space extending about both chambers between the seal sleeve and roll shell which also conducts the cooling liquid into the second chamber from which it is removed from the roll.

The barrier is axially interposed between the inner cavity of the controlled deflection roll and the bearings rotatably supporting the bearing box, seal sleeve and gears, when used. The annular space between the barrier chambers is contiguous with the inner wall of the roll shell or its extension. The bearings and gears, being axially outside of the barrier, are thus isolated from the interior cavity of the roll, both physically and thermally, by the cooling liquid within the barrier chambers and annular space. This establishes a cooling zone. In a contemplated embodiment, the cooling liquid can be pressurized higher than the hydraulic fluid and circulated into, and out of, the inner cavity of the roll in a controlled manner by inward leakage past the chamber sealing surfaces to prevent hydraulic fluid within the roll from migrating to the bearings.

The barrier is capable of maintaining a cooling liquid barrier between the roll shell and roll shaft while providing both axial and radial movement of the roll shell relative to the roll shaft. This accommodates both radial movement of the roll shell during the nip loading, nip relieving or nip contour correction operations of the roll as well as axial expansion of the roll shell due to thermal expansion of the metallic components as the roll becomes heated. In addition, the apparatus accommodates both misalignment caused by shaft deflection during operation and rotary motion of the roll shell while providing rotational sealing of the roll shell.

Since the roll shell, or extension thereof, which is rotatably aligned relative to the bearing box and seal sleeve by bearings, has an inner surface in continuous contact with the cooling liquid to control the temperature of the metal contacting the bearings, a heat shield is established against the passage of heat either by conduction through metal or by contact with the flow of hydraulic fluid.

The bearing lubricant is completely isolated from both the cooling liquid in the barrier chambers and the hydraulic fluid in the roll cavity. Thus, like the bearings themselves, the temperature of the bearing lubricant can be controlled, as desired. In addition, the purity and lubricating characteristics of the bearing lubricant can be controlled independently of both the cooling liquid in the barrier chambers and the hydraulic fluid in the roll cavity.

Accordingly, an object of this invention is to provide a heat shield and liquid barrier between the hydraulic fluid used to actuate a controlled-deflection roll and the bearings rotatably supporting the bearing box, seal sleeve and gears, when used.

Another object of this invention is to provide a barrier for a controlled-deflection roll which accommodates rotary, radial, axial and misalignment motion while maintaining a heat shield and liquid barrier within the roll.

Still another object of this invention is to provide a barrier for a controlled-deflection roll which utilizes a cooling liquid which is separate from the bearing lubricant contour modifying capabilities of the roll shell A feature of this invention is the provision of redundant rotational and misalignment seals between the bearings or drive gears and the interior of the controlled-deflection roll.

Another feature of this invention is the provision of a recirculated cooling liquid in conjunction with a barrier which can accommodate radial and rotary motion between the rotating roll shell and the stationary roll shaft, and misalignment of the shaft.

An object, feature and advantage of this invention is the provision of apparatus for cooling the roll shell, or extension thereof, intermediate the effective face surface of the roll shell and the bearings rotatably supporting the bearing box.

Still another object, feature and advantage of the invention is the added safety and reliability of the roll provided by utilizing seals at both ends of the cooling zone which effectively provides redundant sealing These, and other objects, features and advantages of this invention will become readily apparent to those skilled in the art upon reading the description of the preferred embodiments in conjunction with the attached drawings

DESCRIPTION OF THE PREFERRED EMBODIMENTS

Figure 1:
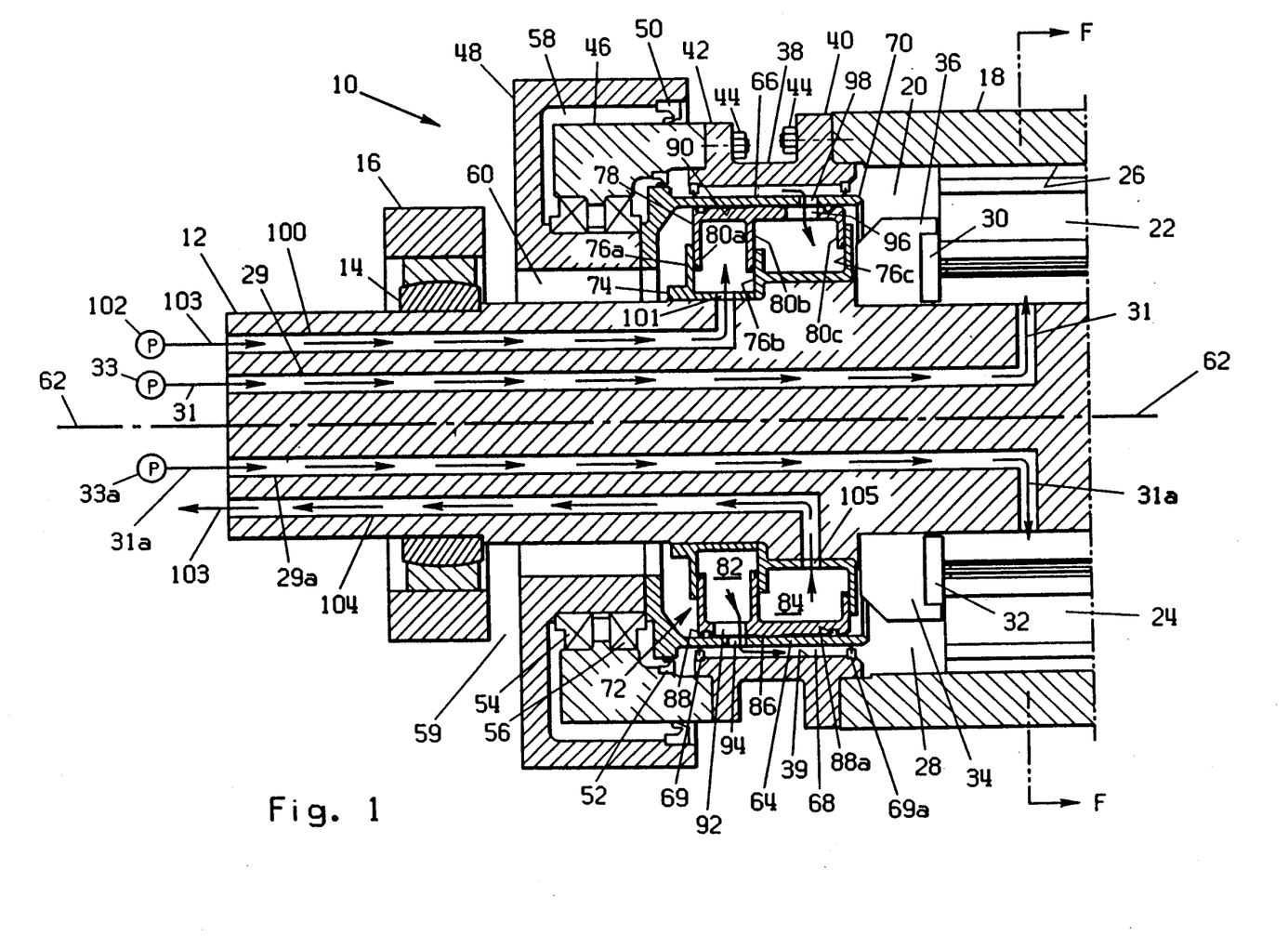
FIG. 1 is a side-elevational view, in section, of one end of a controlled-deflection roll showing a two-chamber barrier disposed intermediate the bearing box support bearings and the interior cavity of the roll.

As shown in FIG. 1, a controlled-deflection roll 10 has a stationary center shaft 12 which is fixedly mounted in a spherical bushing 14 which, in turn, is supported in a mounting, or stand, 16 which may take the form of a stationary mounting attached to the foundation, or structural framework in a papermaking machine, or mountings attached to movable arms in a papermaking machine.

Figure 2:
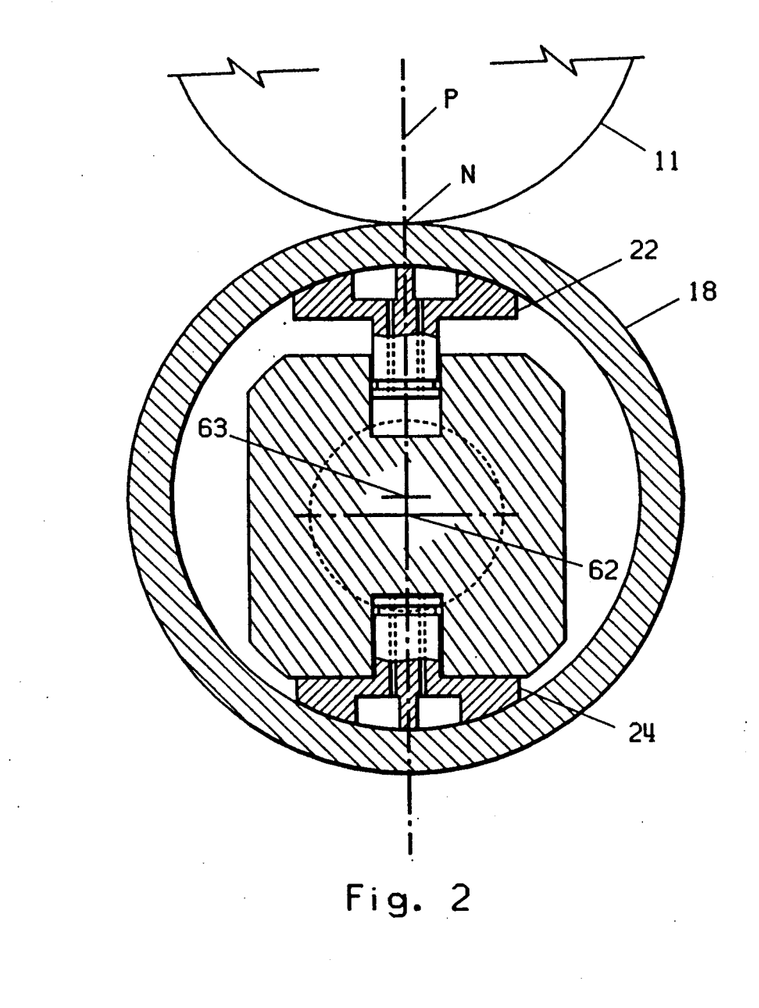
FIG. 2 and FIG. 2A are end views, in section, of a controlled-deflection roll wherein the support shoes have moved the roll shell into nipping engagement with another roll (FIG. 2) and out of nipping engagement with a mating roll (FIG. 2A).
Figure 2A:
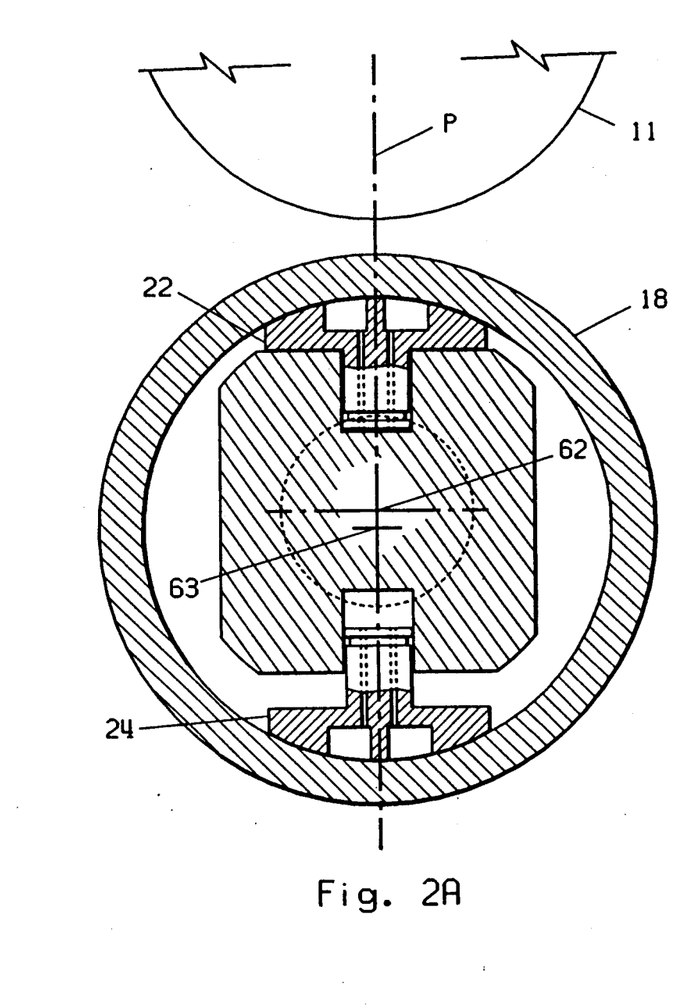

Throughout this discussion, it is understood that both ends of the controlled-deflection roll described are essentially the same and that the barrier forming the basis of this invention can be located at either or, preferably, both ends of the roll. Accordingly, only one end of the controlled-deflection roll is shown and will be described over the roll shaft and defines, with the shaft, a cavity 20 within the interior of the roll. Mounted within one or more openings in the roll shaft is one or more shoes 22,24 which are diametrically opposed and which are separately actuatable and deactuatable to move the roll shell translationally upwardly or downwardly and into, or out of, nipping engagement with a mating roll as shown in FIGS. 2, 2A. The manner in which the shoe, or shoes, 22,24 can be supplied with hydraulic fluid, or have hydraulic fluid removed therefrom, to move the shoes into, or out of, engagement with the inner surface 26 of the roll shell to either load the roll shell into nipping engagement with a mating roll, or to modify the roll shell deflection, or crown, contour is well-known to those skilled in the art and will, accordingly, not be discussed in further detail other than to show, somewhat schematically, the selective application of hydraulic fluid 28, such as oil, via conduits 29, 29a to shoes 22, 24 as designated by arrows 31,31a. Similarly, it is well understood within the papermaking trade that upper shoe 22, or lower shoe 24, can comprise a plurality of axially aligned shoes or a single shoe and can operate either hydrostatically or hydrodynamically at its, or their, interface with the interior surface of the roll shell. For the purposes of this invention, all that need be understood is that the interface of each of the one or more shoes supporting the roll shell into, or out of, nipping engagement N with a mating roll along the nip plane P is lubricated with the same hydraulic fluid which actuates the shoe, or shoes. The nip plane extends along the nip line of contact and the longitudinal axes of roll 10 and the mating roll 11.

The hydraulic fluid used to actuate and lubricate the support shoes 22,24 collects within the interior cavity 20 of the roll in a pool 28 which is shown near the end of the roll shell adjacent the shoe 24 and sealing structure comprising seals 30,32 and end caps 34,36.

For the purposes of this discussion, the effective face of the controlled-deflection roll can be said to begin at a point radially outwardly from the end of the shoe 22 beneath that portion of the shell and extend inwardly, as designated by F, to the corresponding place at the other end of the roll.

At the end of the roll shell, a hollow, cylindrical spacer 38 having axially inwardly and axially outwardly collars 40, 42 is attached to the end of the roll shell by suitable means, such as cap screws 44 to form an axial extension of the roll shell. The outer end of spacer 38 is attached to a bearing ring 46 in substantially the same manner. The bearing ring can also serve as a ring gear for rotatably driving the roll shell. A bearing box 48 encloses the bearing ring and defines a space about the bearing ring which is sealed radially outwardly and radially inwardly from the bearing ring with seals 50, 52. The bearing ring rotatably supports the bearing box with bearings 54, 56. Bearing lubricant 58 is completely enclosed about the bearings by the bearing box and bearing ring, and contained by seals 50, 52.

The bearing box is disposed about an end of the stationary roll shaft, but is spaced from the roll shaft by an annular opening 60 to permit translational movement perpendicular to the longitudinal axis 62 of the roll shaft which coincides with the axis of rotation 63 of the roll shell when the roll shell is centered about the roll shaft. The roll shell is not, therefore, necessarily rotatably supported by bearings 54, 56, but is aligned by the bearings with the bearing ring and bearing box.

Extending axially inwardly from the bearing box, and co-axial with bearings 54, 56, is a hollow, cylindrical seal sleeve 64. Bearings 54, 56 thus maintain alignment of the seal sleeve relative to the roll shell co-axially about the axis of rotation 63 of the roll shell In this discussion, the term "annular" will be used to refer to a hollow, cylindrical body or space, such as seal sleeve 64 and the space defined by the seal sleeve and roll shell 18. The seal sleeve is spaced inwardly from the inner wall 39 of spacer 38 to define an annular space 68 between the seal sleeve and spacer. The distal end 70 of the seal sleeve extends into the cavity 20 and does not bear against any structure or support in the longitudinal direction of the roll. A pair of spaced, circumferential rotary seals 69, 69a are mounted between the spacer and the seal sleeve to seal space 68 at either end of the seal sleeve.

The barrier, generally designated with the numeral 72, comprises an inner spool member 74, which can comprise more than one component part, and which has, in the preferred embodiment, three radially outwardly extending flanges 76a, 76b and 76c. It also comprises a corresponding outer spool member 78 mounted within the annular seal sleeve 64 and includes three corresponding radially inwardly extending flanges 80a, 80b and 80c. The inner and outer spool members are preferably made of metal and the corresponding flange pairs 76a, 80a, 76b, 80b, 76c, 80c are arrayed such that they radially overlap one another such that each flange of each pair is contiguous with its corresponding flange on the other spool. The flange pairs and inner and outer spool body members, therefore, define first and second liquid chambers 82, 84, respectively The overlapping flanges of the corresponding pairs can slide against one another radially inwardly and outwardly to permit chambers 82, 84 to be radially extensible The outer surface 86 of the outer spool member is made with a large diameter radius to form a spherical surface. A pair of circumferentially extending, axially spaced seals 88, 88a are mounted between the outer spool member spherical surface 86 and the inner wall 90 of the seal sleeve 64. This permits the outer spool member to rotate slightly about an axis perpendicular to the nip plane P through the longitudinal axis 62 of the roll to accommodate misalignment of the roll shaft due to deflection without causing a corresponding movement of the seal sleeve 64. Since the inner spool member moves with the outer spool, this action also prevents relative movement, and loss of sealing engagement, between flanges 76a, 80a, 76b, 80b, 76c, 80c so that chambers 82, 84 remain sealed during roll shaft deflection.

The flanges in the inner and outer spool members define two axially spaced, circumferentially extending chambers 82, 84 within barrier 72. An opening 92 in the outer wall of the outer spool member, and a corresponding opening 94 in the seal sleeve, establish fluid communication between the first chamber 82 and the annular space 68. Similarly, a second opening 96 in the outer wall of the outer spool member axially inwardly of the opening 92, and a corresponding opening 98 in the seal sleeve, permit fluid communication between the annular space 68 and the second chamber 84.

An inlet supply bore 100 extending from the end of the roll shaft to an opening 101 in the first chamber 82 provides access from a pressurized source, such as a pump 102, of cooling liquid 103 to the first chamber 82. Similarly, a return bore 104 extending from outside the roll shaft provides a conduit for the cooling fluid to exit the second chamber 84 from a similar opening 105.

In operation, the center shaft 12 is maintained in a desired stationary position The roll shell is rotationally driven by a means, such as a motor driven gear (not shown) connected to the roll shell in a manner well-known to those skilled in the art. The manner in which the roll shell is rotated does not form part of the invention.

One, or the other, or both, of the roll shell support shoes 22, 24 is actuated by the application of a suitable hydraulic fluid, such as oil, to the appropriate shoe, or shoes, in a manner well-known to those skilled in the art to move the roll shell translationally into, or out of, nipping engagement with a mating roll, which nipping engagement is designated N in FIG. 2.

As the roll shell rotates and is moved into, and out of, nipping engagement with the mating roll, as shown in FIGS. 2 and 2A, barrier 72 is required to accommodate several types of movement of the component parts of the roll. It must accommodate translational movement of the roll shell radially inwardly and outwardly from the longitudinal axis 62; it must accommodate rotational movement of the roll shell and spacer relative to seal sleeve 64; it must accommodate misalignment of the roll shell/spacer relative to the center shaft due to deflection of the center shaft; and axial elongation of the component parts due to thermal expansion.

Since the distal end 70 of the stationary seal sleeve 64 extends into the roll cavity 20, axial elongation of the roll shell and spacer relative to the seal sleeve is accommodated by the spaced rotary seals 69, 69a between the spacer and seal sleeve which bear against the outer cylindrical surface 66 of the seal sleeve which is concentric with the longitudinal axis 63 of the roll shell. There is sufficient space 59 between the roll stand 16 and bearing box 48 to accommodate axial movement of the bearing box. The bearings and bearing box moves axially with the bearing ring.

The radially extending interfaces between corresponding sealing surfaces between flange pairs 76a, 80a; 76b, 80b; 76c, 80c accommodate radial movement of the roll shell as it is moved translationally by the application by pumps 33, 33a, or withdrawal, of hydraulic fluid to shoes 22, 24. This also permits the radially extensible change in shape of the barrier chambers 82, 84 while maintaining the chambers sealed. Thus, pressurized cooling liquid is supplied to the first chamber 82 via conduit 100, which is axially outside of second chamber 84, flows through chamber 82, out into annular space 68, inwardly into chamber 84 and out of the roll via conduit 104. The cooling liquid, thus, is brought into direct engagement with the inner surface 39 of spacer 38 to cool spacer 38, or to cool the inner surface of the end of shell 18 if a spacer is not utilized This inward flow of cooling liquid 103 within both annular space 68 and chambers 82, 84, in conjunction with rotary seals 69, 69a and the cooperating flanges in chambers 82, 84 effectively seals the hot hydraulic fluid 28 from physical contact with the bearings. In addition, the cooling zone, which extends substantially between rotary seals 69, 69a or the axial length of inner and outer spool members 74, 78, effectively shields the bearings from radiant heat from the hot hydraulic fluid and minimizes the conduction of heat through the barrier components themselves due to their relatively thin construction and intimate contact with cooling liquid Thus, a heat shield between the hot hydraulic fluid within the roll cavity is established and maintained by this invention. Although the invention has been described using separate fluids for the bearing lubricant 58, cooling liquid 103 and hydraulic fluid 28, these fluids do not necessarily have to be different. What is important, and what is intended to be accomplished with this invention, is that the bearing lubricant be maintained separate from the cooling liquid which, in turn, is preferably maintained separate from the hydraulic fluid. This invention accomplishes this concept while accommodating the rotational, translational and misalignment movements of the roll during operation. However, as mentioned previously, it is contemplated, and within the scope of the invention, to pressurize the cooling liquid in the barrier chambers at a greater pressure than the hydraulic fluid applied to the support shoes to thereby maintain any seepage of cooling liquid relative to the hydraulic fluid in the direction inwardly into the roll cavity from where it is removed by means, such as a sump pump (not shown), which is well-known to those skilled in the art. Accordingly, it is contemplated that the cooling liquid and the hydraulic fluid could be the same liquid, if desired. Otherwise, in the preferred embodiment, the bearing lubricant, cooling liquid and hydraulic fluid are maintained separate and the heat shield is established and maintained.

Various modifications are contemplated which are intended to be within the scope of the invention. For example, the concept of providing radial extensibility to the barrier chambers 82, 84 could be provided by other means, such as walls made of flexible material extending between the inner and outer spools. Also, the barrier could comprise one or more chambers with direct contact with the spacer.

Finally, the barrier is intended to be generic to any controlled-deflection type of roll having need to separate the bearing lubricant and hydraulic fluid and where the roll shell can move outwardly, or translationally, relative to the roll shaft, or bow under nip profile control enough to otherwise create a leak for the hydraulic fluid to flow axially outwardly to the bearings. The barrier is, therefore, not limited to use in the so-called self-loading type of controlled deflection roll.

Accordingly, a heat barrier for a controlled-deflection roll has been shown and described which meets the stated objectives and exhibits the features and advantages set forth and others which will be readily apparent to those skilled in the art upon reading the specification, claims and viewing the attached drawings.

What is claimed is:

1. In a controlled deflection roll for moving into, and out of, nipping engagement with a mating roll, and having a non-rotatable center shaft, a hollow, cylindrical roll shell having a longitudinal axis of rotation and disposed about the center shaft to define an interior cavity of the roll therewith, bearings near either end of the center shaft and disposed about the center shaft, support means to support the roll shell against the center shaft to position the roll shell into, and out of, nipping engagement with the mating roll, or to adjust the nip line of contact therebetween, or both, the combination comprising:

bearing means near either end of the roll shell;
the bearings rotatably locating the bearing means co-axially relative to the roll shell, or an annular, co-axial spacer extension thereof;
means for maintaining bearing lubricant in the bearing means for lubricating the bearings;
means for supplying hydraulic fluid for actuating the support means and lubricating the interface between the roll shell and support means in the interior cavity; and
barrier means disposed between the roll shaft and the roll shell, or an annular, co-axial spacer extension thereof, near at least one end of the roll, the barrier means comprising a radially extensible chamber means for receiving a cooling liquid, said barrier means comprising a liquid barrier and a heat shield between the hydraulic fluid in the interior cavity and the bearing on the corresponding end of the roll.

2. A controlled deflection roll as recited in claim 1, wherein:
the barrier means includes a seal sleeve defining a space between the seal sleeve and the roll shell, or an annular, co-axial spacer extension thereof, the space adapted to receive the cooling liquid.

3. A controlled deflection roll as recited in claim 2, further including:
misalignment seal means mounted between the seal sleeve and the chamber means for permitting sealed misalignment movement between the seal sleeve and the chamber means.

4. A controlled deflection roll as recited in claim 1, wherein:
the bearing means includes a bearing box and a bearing ring whereby the bearing is supported on the bearing ring which, in conjunction with the bearing box, enclose the bearing and its lubricant in spaced adjacency to the barrier means.

5. A controlled deflection roll as recited in claim 1, wherein:
the barrier means includes two chambers; and further including,
means for establishing fluid communication between the two chambers;
inlet conduit means for conducting cooling liquid into a first one of the two chambers; and
outlet conduit means for removing cooling liquid from a second one of the two chambers.

6. A controlled deflection roll as recited in claim 5, wherein:
the first one of the two chambers is located axially outside of the second of the two chambers.

7. A controlled deflection roll as recited in claim 5, wherein:

the chambers are formed by inner and outer opposed spool members with the outer spool member adapted to move translationally with the roll shell, and a plurality of flange pairs cooperating to maintain sealing engagement therebetween and maintain sealed extensibility of the chambers while permitting relative translational movement between the spool members as the roll shell moves translationally.

8. A controlled deflection roll as recited in claim 5, further including:
  seal sleeve means associated with the barrier means, and defining a space between the barrier means and the roll shell, or an annular, co-axial spacer extension thereof, and having opening means for establishing fluid communication between the space and the first and second chambers, whereby the cooling fluid from the first of the two chambers is received in the space and conducted into the second of the two chambers.

9. A controlled deflection roll as recited in claim 8, wherein:
  the seal sleeve means is co-axially secured relative to the bearing means to thereby maintain the space annularly relative to the roll shell, or an annular, co-axial spacer extension thereof.

10. A controlled deflection roll as recited in claim 8, wherein:
  the seal sleeve means includes rotary seal means mounted between the seal sleeve means and the roll shell, or an annular, co-axial spacer extension thereof, for maintaining a rotary seal therebetween.

11. A controlled deflection roll as recited in claim 9, wherein:
  the rotary seal means comprises a pair of axially spaced, circumferentially extending seals disposed near either end of the space between the seal sleeve means and the roll shell, or an annular, co-axial spacer extension thereof, to seal the ends of the space.

12. In a controlled deflection roll for moving into, and out of, nipping engagement with a mating roll, and having a non-rotatable center shaft, a hollow, cylindrical roll shell having a longitudinal axis of rotation and disposed about the center shaft to define an interior cavity of the roll therewith, bearings near either end of the center shaft and disposed about the center shaft, support means to support the roll shell against the center shaft to position the roll shell into, and out of, nipping engagement with the mating roll or to adjust the nip line of contact therebetween, or both, the combination comprising:
  a hollow spacer extending from at least one end of the roll shell, co-axially therewith and having an inner surface in spaced adjacency with the roll shaft;
  a seal sleeve extending longitudinally about the roll shaft, and co-axially therewith, and defining a space with the inner surface of the spacer;
  rotary seal means mounted between the seal sleeve and inner surface of the spacer;
  a bearing ring mounted to the spacer;
  a bearing box;
  the bearings are mounted intermediate the bearing ring and bearing box for rotatably aligning the spacer about the seal sleeve;
  means for maintaining bearing lubricant for lubricating the bearings, said means operatively sealing the bearing lubricant relative to the bearing ring and bearing box;
  means for supplying hydraulic fluid into the roll for actuating the support means and lubricating the interface between the roll shell and support means in the interior cavity;
  barrier means intermediate the roll shaft and seal sleeve, and intermediate the bearings and roll cavity, said barrier means having a radially extensible chamber for receiving a cooling liquid, the chamber establishing a heat shield between the
  bearings and the hydraulic fluid in the interior cavity of the roll.

13. A controlled deflection roll as recited in claim 12, wherein:
  the seal sleeve is free of axial restraint.

14. A controlled deflection roll as recited in claim 12, wherein:
  the seal sleeve and barrier means contain at least one opening to establish fluid communication between the chamber and space, whereby the cooling liquid is introduced into the space between the seal sleeve and spacer, whereby a liquid barrier and heat shield is established and maintained between the interior cavity of the roll and the bearings.

15. A controlled deflection roll as recited in claim 12, further including:
  inlet means for introducing a supply of cooling liquid from outside the roll into the chamber;
  outlet means for removing cooling liquid from the barrier means.

16. In a controlled deflection roll for moving into, and out of, nipping engagement with a mating roll, and having a non- rotatable center shaft, a hollow, cylindrical roll shell having a longitudinal axis of rotation and disposed about the center shaft to define an interior cavity of the roll therewith, bearings near either end of the center shaft and disposed about the center shaft, support means to support the roll shell against the center shaft to position the roll shell into, and out of, nipping engagement with a mating roll, or to adjust the nip line of contact therebetween, or both, the combination comprising:
  bearing means near either end of the roll shell;
  the bearings rotatably aligning the roll shell, or are extension thereof, in the bearing means;
  means for maintaining bearing lubricant for lubricating the bearings relative to the bearing means;
  means for supplying hydraulic fluid into the roll for actuating the support means and lubricating the interface between the roll shell and support means;
  barrier means disposed between the roll shaft and the roll shell, or an annular, co-axial spacer extension thereof, near at least one end of the roll, the barrier means including a seal sleeve extending either beneath a portion of the roll shell, or an annular, co-axial spacer extension thereof, and defining a space therewith, and spool means mounted intermediate the seal sleeve and roll shaft, said spool means defining first and second radially extensible chambers for receiving a cooling liquid;
  means for sealing the space;
  means for establishing fluid communication between the first chamber and the space and between the space and the second chamber, whereby cooling liquid can flow between the first chamber into the space and into the second chamber;

first conduit means for establishing fluid communication from a source of cooling liquid outside the roll to the first chamber;

second means for removing cooling fluid from the second chamber;

whereby a liquid barrier and heat shield is established between the roll cavity and the bearings.

17. A controlled deflection roll as recited in claim 16, further including:

misalignment seal means mounted between the spool means and seal sleeve to accommodate misalignment between the roll shell and roll shaft while maintaining a liquid seal between the spool means and seal sleeve.

18. A controlled deflection roll as recited in claim 16, wherein:

the means for sealing the space comprise a pair of axially spaced rotary seals to maintain a liquid seal between the seal sleeve and rotating roll shell, or an annular, co-axial spacer extension thereof.

19. A controlled deflection roll as recited in claim 16, wherein:

the spool means comprises inner and outer spool members, each having corresponding radially extending flanges which cooperate to provide a radially extensible seal which define radially extending walls of the first and second chambers and which provide liquid seals in the chambers as the roll shell is urged translationally relative to the shaft by the support means.

20. A controlled deflection roll as recited in claim 19, wherein:

misalignment seal means mounted between the outer spool member and the seal sleeve to accommodate misalignment between the roll shell and roll shaft;

the outer spool member has a curved outer surface which cooperates with the misalignment seal means to provide a liquid seal between the outer spool member and the seal sleeve.

21. A controlled deflection roll as recited in claim 16, wherein:

the second means for removing cooling liquid comprises a conduit leading from the second chamber to the exterior of the roll.

* * * * *

UNITED STATES PATENT AND TRADEMARK OFFICE
CERTIFICATE OF CORRECTION

PATENT NO. : 5,010,633
DATED : 04/30/91
INVENTOR(S) : Dale A. Brown et al

It is certified that error appears in the above—identified patent and that said Letters Patent is hereby corrected as shown below:

Column 10, Line 45    "are" should read ---an annular, co-axial spacer---.

Signed and Sealed this

Eighth Day of September, 1992

Attest:

DOUGLAS B. COMER

*Attesting Officer*    Acting Commissioner of Patents and Trademarks

UNITED STATES PATENT AND TRADEMARK OFFICE
CERTIFICATE OF CORRECTION

PATENT NO.   : 5,010,633

DATED        : April 30, 1991

INVENTOR(S)  : Dale Brown et al

It is certified that error appears in the above-identified patent and that said Letters Patent is hereby corrected as shown below:

Column 4, line 20:
--A hollow, cylindrical roll shell 18 is disposed--
should be before "over the roll shaft and defines,
with the shaft, a cavity".

Signed and Sealed this

Thirteenth Day of October, 1992

*Attest:*

DOUGLAS B. COMER

*Attesting Officer*   *Acting Commissioner of Patents and Trademarks*